US009648853B2

(12) United States Patent
Ecker

(10) Patent No.: US 9,648,853 B2
(45) Date of Patent: May 16, 2017

(54) SYSTEMS AND METHODS FOR DETECTING ANIMAL BEHAVIOR

(71) Applicant: Phillip Marks Ecker, Orono, MN (US)

(72) Inventor: Phillip Marks Ecker, Orono, MN (US)

(*) Notice: Subject to any disclaimer, the term of this patent is extended or adjusted under 35 U.S.C. 154(b) by 125 days.

(21) Appl. No.: 14/641,372

(22) Filed: Mar. 7, 2015

(65) Prior Publication Data
US 2016/0242387 A1 Aug. 25, 2016

Related U.S. Application Data

(60) Provisional application No. 62/118,089, filed on Feb. 19, 2015.

(51) Int. Cl.
*A01K 15/02* (2006.01)
*A01K 27/00* (2006.01)
*H04N 7/18* (2006.01)

(52) U.S. Cl.
CPC .......... *A01K 15/021* (2013.01); *A01K 15/029* (2013.01); *A01K 27/009* (2013.01); *H04N 7/185* (2013.01)

(58) Field of Classification Search
CPC ... A01K 15/021; A01K 15/029; A01K 27/009
See application file for complete search history.

(56) References Cited

U.S. PATENT DOCUMENTS

| 6,263,836 B1 | 7/2001 | Hollis |
| 6,487,992 B1 | 12/2002 | Hollis |
| 2012/0255505 A1 | 10/2012 | Gauthier |
| 2014/0123912 A1 | 5/2014 | Menkes et al. |

*Primary Examiner* — Kristen C Hayes

(57) ABSTRACT

Disclosed are systems and methods for controlling animal behavior, such as a dog. In an embodiment, a system can a delivery unit that can include an outer housing, first and second electrodes protruding from a back surface of the outer housing, and a position detection system electrically coupled to the first electrode and the second electrode. The position detection system can include an accelerometer configured to detect one of a predetermined distance of the dog's neck with respect to a ground surface, a predetermined motion of the dog's neck with respect to the ground surface, and a predetermined angle of the dog's neck with respect to a level surface.

14 Claims, 10 Drawing Sheets

SYSTEMS AND METHODS FOR DETECTING ANIMAL BEHAVIOR

CROSS-REFERENCE TO RELATED APPLICATIONS

This application claims the benefit of U.S. Provisional Patent Application No. 62/118,089; filed Feb. 19, 2015; and entitled SYSTEMS AND METHODS FOR DETECTING ANIMAL BEHAVIOR. The entire contents of Patent Application No. 62/118,089 are incorporated by reference herein.

BACKGROUND

Field of Invention

Various embodiments disclosed herein relate to systems for aiding a user in managing pets, especially dogs. Specifically, certain embodiments relate to a system for monitoring and correcting the behavior of a dog.

Description of Related Art

Unruly dogs are difficult to control, especially when they are home alone and unable to be monitored by a person. Many people have installed spy cameras in their homes to monitor dog behavior when the dog is home alone. However, spy cameras are only able to detect unruly behavior if it occurs within the field of view of the camera. As well, spy cameras do not prevent the unruly behavior while it is in progress. Thus, a system is desired that monitors and corrects unruly behavior while it happens.

SUMMARY

The present invention comprises a system for monitoring and correcting dog behavior. The system comprises an outer housing coupled to the neck belt of a dog such that, the outer housing lies next to the skin of the dog. The outer housing comprises a delivery unit, which in turn comprises a pair of electrodes for delivering electric signals to the dog in response to a predetermined trackable behavior. The delivery unit further comprises a position detection system, which comprises accelerometer for measuring the distance between the dog's neck and the ground, the angle of the dog's neck with respect to the ground, and motion of the dog's neck with respect to the ground. The values obtained by the position detection system are instantly compared against corresponding predetermined threshold values wherein, upon determining that the measured values are greater than the threshold values, electrical are delivered by the delivery unit 11 through the pair of electrodes thereby, inculcating discipline to the dog through discomfort.

In an embodiment, the delivery unit further comprises a power source electrically coupled to the position detection system, the first electrode, and the second electrode. The delivery unit can further include a wireless communication module coupled to the outer housing, wherein the wireless communication module comprises at least one of Bluetooth, wireless local area network (WiFi), infrared, and radio frequency.

In some embodiments, the system comprises a remote computing device communicatively coupled to the wireless communication module, wherein the remote computing device is configured to implement a software program, wherein the software program is configured to control at least one of threshold and duration or intensity of the signal.

The software program can be configured to select the predetermined distance of the dog's neck with respect to the ground surface, wherein the software program is configured to select the predetermined angle of the dog's neck with respect to the level surface, and wherein in response to the position detection system detecting that at least one of the dog's neck is located at least the predetermined distance from the ground surface, and the dog's neck is located at least the predetermined angle from the level surface, the delivery unit is configured to deliver the signal, via the first electrode and the second electrode, to the first portion and the second portion of the dog's skin.

As well, the software program can comprise a first icon configured to select between the first power state whereby the delivery unit is powered on, and the second power state whereby the delivery unit is powered off, a second icon configured to select at least one of the first distance state whereby the delivery unit delivers the signal to the dog's neck upon in response to detecting the dog's neck is located at least the predetermined distance from the ground surface, the second distance state whereby the delivery unit does not deliver the signal to the dog's neck upon in response to detecting the dog's neck is located at least the predetermined distance from the ground surface, the first angle state whereby the delivery unit delivers the signal to the dog's neck in response to detecting the dog's neck is located at least the predetermined angle from the level surface, and the second angle state whereby the delivery unit does not deliver the signal to the dog's neck in response to detecting the dog's neck is located at least the predetermined angle from the level surface.

In some embodiments, the outer housing comprises a front surface facing opposite the back surface, and the delivery unit further comprises a button coupled to the front surface of the outer housing. The button can be configured to select at least one of: a first power state whereby the delivery unit is powered on, a second power state whereby the delivery unit is powered off, a first wireless state whereby the wireless communications module is able to wirelessly communicate with the remote computing device, a second wireless state whereby the wireless communications module is disabled from wirelessly communicating with the remote computing device, a first distance state whereby the delivery unit delivers the signal to the dog's neck upon in response to detecting the dog's neck is located at least the predetermined distance from the ground surface, a second distance state whereby the delivery unit does not deliver the signal to the dog's neck upon in response to detecting the dog's neck is located at least the predetermined distance from the ground surface, a first angle state whereby the delivery unit delivers the signal to the dog's neck in response to detecting the dog's neck is located at least the predetermined angle from the level surface, and a second angle state whereby the delivery unit does not deliver the signal to the dog's neck in response to detecting the dog's neck is located at least the predetermined angle from the level surface.

The position detection system can detect the predetermined distance of the dog's neck with respect to a ground surface, the predetermined motion of the dog's neck with respect to the ground surface, and the predetermined angle of the dog's neck with respect to the ground surface, wherein the predetermined motion comprises one of a jumping motion and a standing motion, and wherein the predetermined angle is greater than 45-degrees.

In an embodiment, the delivery unit comprises a camera coupled to the outer housing, wherein the camera is configured to record an image, and wherein the delivery unit is configured to transmit the image to the remote computing device.

The delivery unit can comprise a motion detector configured to detect a movement of the dog. As well, the camera can be configured to record the image based upon the motion detector detecting the movement.

Other objects and advantages of the embodiments herein will become readily apparent from the following detailed description taken in conjunction with the accompanying drawings.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
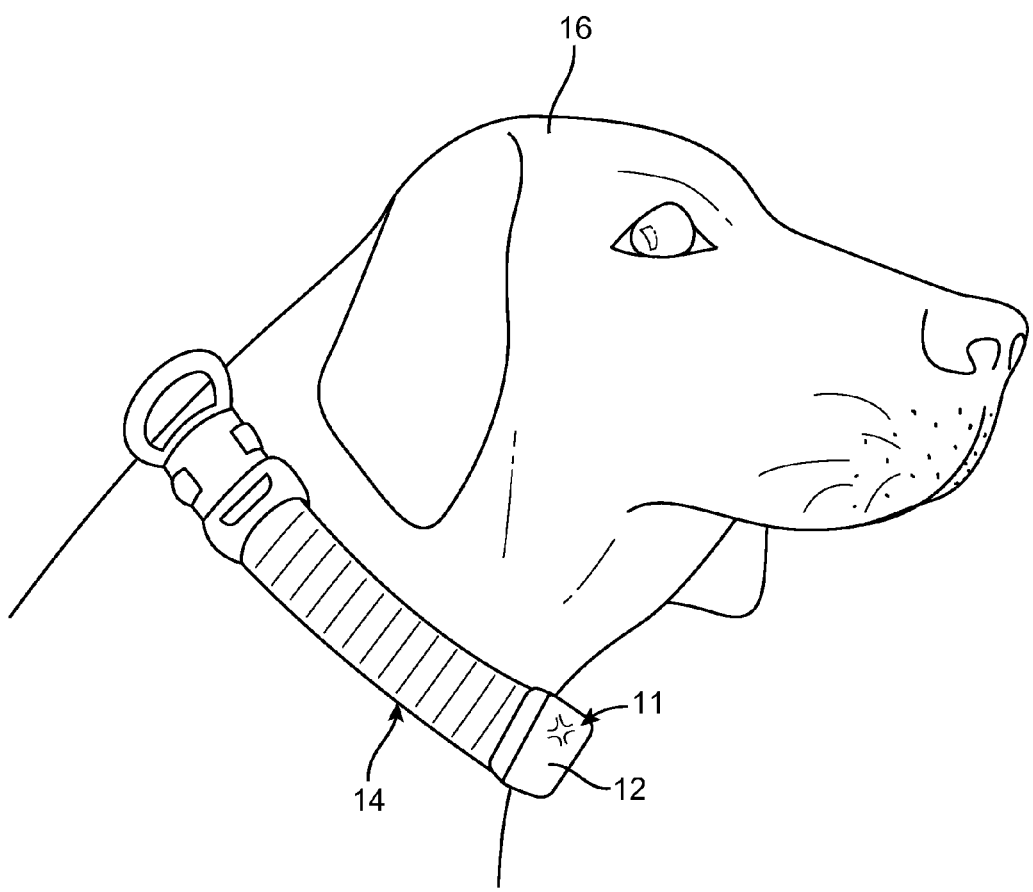
FIG. 1 is an illustration of a dog wearing the dog collar.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Additionally, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

REFERENCE NUMERALS

Figure 2:
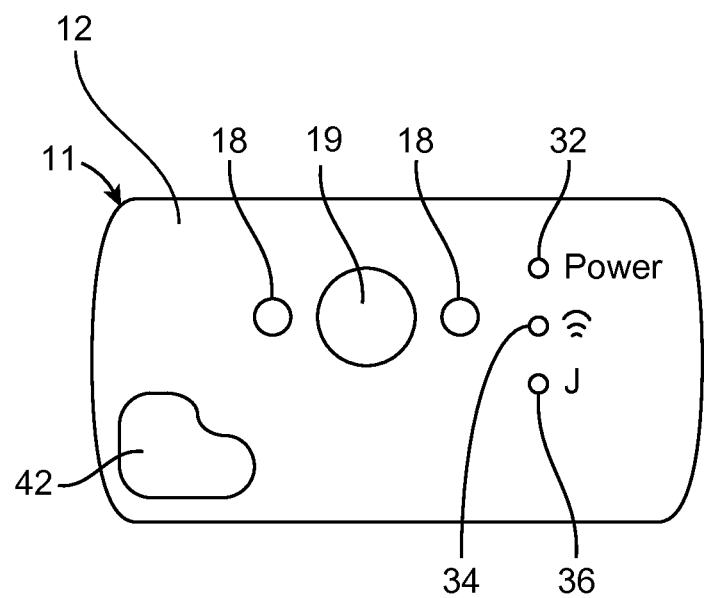
FIG. 2 is an illustration of a front view of the outer housing.
Figure 3:
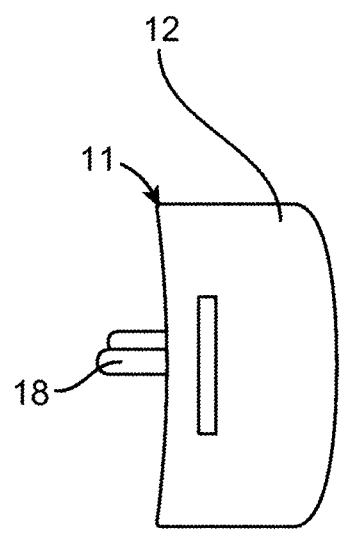
FIG. 3 is an illustration of a side view of the outer housing.

10—System for Monitoring and Correcting a Dog
11—Delivery unit
12—Outer Housing
14—Dog Collar
16—Dog
18—Pair of Electrodes, or First and Second Electrodes
19—Button
20—Position Detection System
22—Database
24—Processor
26—Remote Computing Device
28—Wireless Communications Network
30—Wireless Communication Module
32—First LED indicator
34—Second LED indicator
36—Third LED indicator
38—First Icon
40—Second Icon
42—Rubber Piece Introduction The present invention comprises a system for monitoring and correcting the behavior of a dog by means of delivering electrical signals or shock to a dog as a preventive or a correctional measure in response to the dog exceeding an allowable measure of behavior, which is quantified by threshold values predetermined by a user. Referring to FIGS. 1-3, the system 10 comprises a delivery unit 11 comprising an outer housing 12, which is coupled with a dog collar 14 that is secured snugly around the neck of the dog 16. The outer housing 12 comprises a pair of first and second spaced-apart electrodes 18 protruding from the back surface thereof. The first and second electrodes 18 are configured to be in contact with the first and second portions of the dog's skin respectively. More particularly, the pair of electrodes 18 abuts the skin below the dog's mouth.

Figure 4:
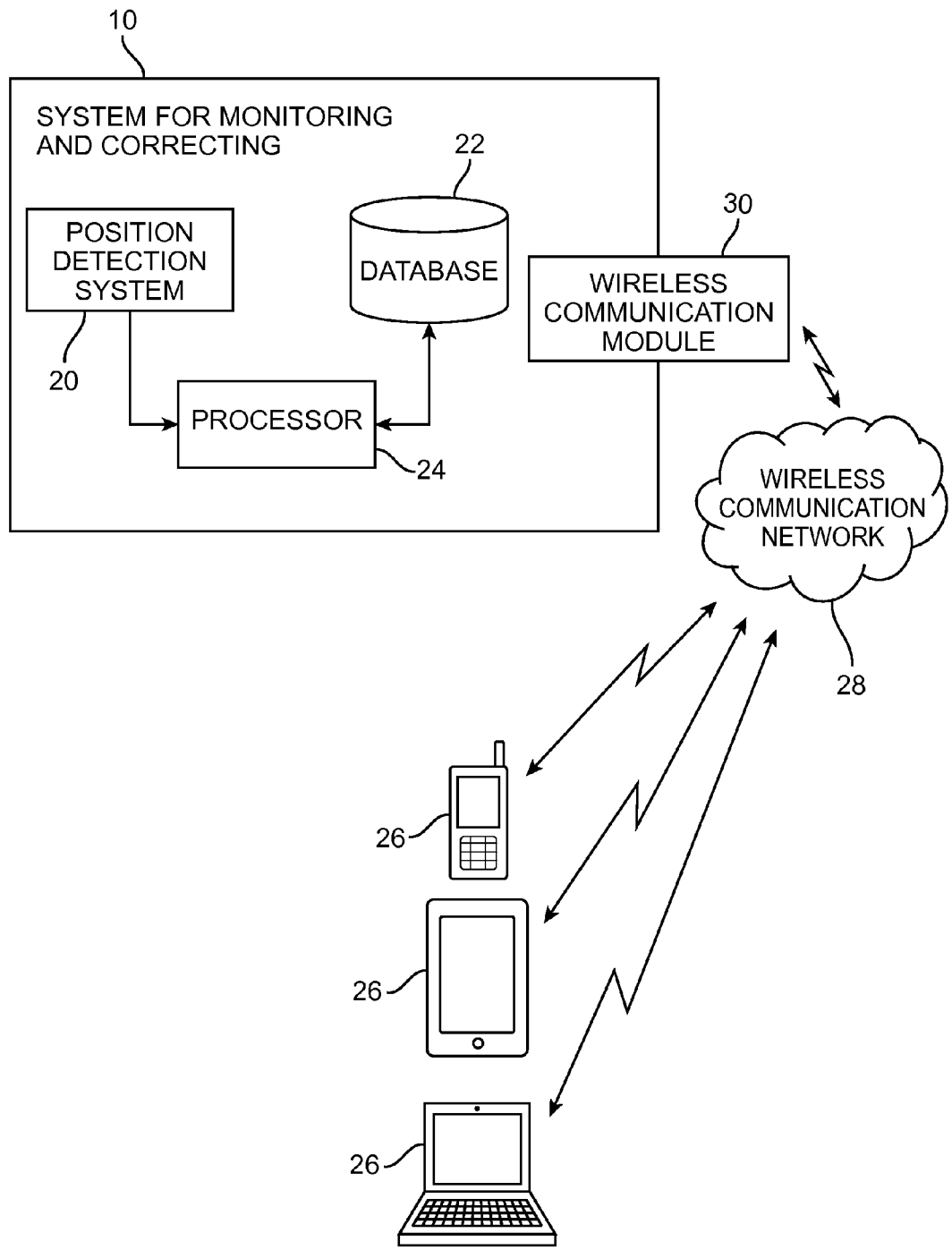
FIG. 4 is a block diagram of the system for monitoring and correcting a dog.

Referring to FIG. 4, the delivery unit 11 further comprises a position detection system 20, which is physically coupled to the outer housing. The position detection system 20 comprises an accelerometer configured to determine the distance between the dog's neck and the ground, the angle of the dog's neck with respect to the ground, and motion of the dog's neck with respect to the ground. In some embodiments the delivery unit 11 further comprises a database 22 comprising a plurality of predetermined threshold values for the distance between the dog's neck and the ground, the angle of the dog's neck with respect to the ground, and the motion of the dog's neck with respect to the ground. Notably, in some embodiments, the threshold value for the distance between the dog's neck and the ground is 36 inches. Likewise, the threshold value for the angle of the dog's neck with respect to the ground is 45 degrees. As well, the motion of the dog's neck with respect to the ground can include either a jumping or standing motion.

Now with reference to FIGS. 2-4, the delivery unit 11 shown can further include a processor 24 disposed within the outer housing and disposed in operative communication with the position detection system 20, the pair electrodes 18, and the database 22. The processor 24 can be configured such that, the processor 24, upon detecting that the distance between the dog's neck and the ground exceeds the corresponding threshold value, and thereby initiates an electrical signal to be delivered to the dog through the first and second electrodes 18.

Similarly, the processor 24 can be configured such that, the processor 24, upon detecting that the angle of the dog's neck with respect to the ground exceeds the corresponding threshold value, can deliver an electrical signal to the dog through the first and second electrodes 18. A power source (not shown) can be disposed within the outer housing 12 for powering the pair of electrodes 18, the processor 24 and the position detection system 20. The power source, more particularly, can include a rechargeable battery, such as a lithium ion battery. The battery can be chargeable by releasing a rubber piece 42 on the outer housing 12, which blocks the charging port.

Referring to FIGS. 2 and 3, the front surface of the outer housing can include three light emitting diode (LED) indicators, such as, first, second, and third LED indicators 32, 34, and 36. The first LED indicator 32 can indicate whether the delivery unit 11 is in a first power state or a second power state. In the first power state, the delivery unit 11 can be powered on. Accordingly, in the second power state, the delivery unit 11 can be powered off. The second LED indicator 34 can indicate whether the delivery unit 11 is in a first wireless state or a second wireless state. In the first wireless state, the wireless communication module can be activated so as to facilitate communication between the remote computing device and the delivery unit 11. In the second wireless state, the wireless communication module can be deactivated so as to disable communication between the remote computing device and the delivery unit 11.

Figure 5:
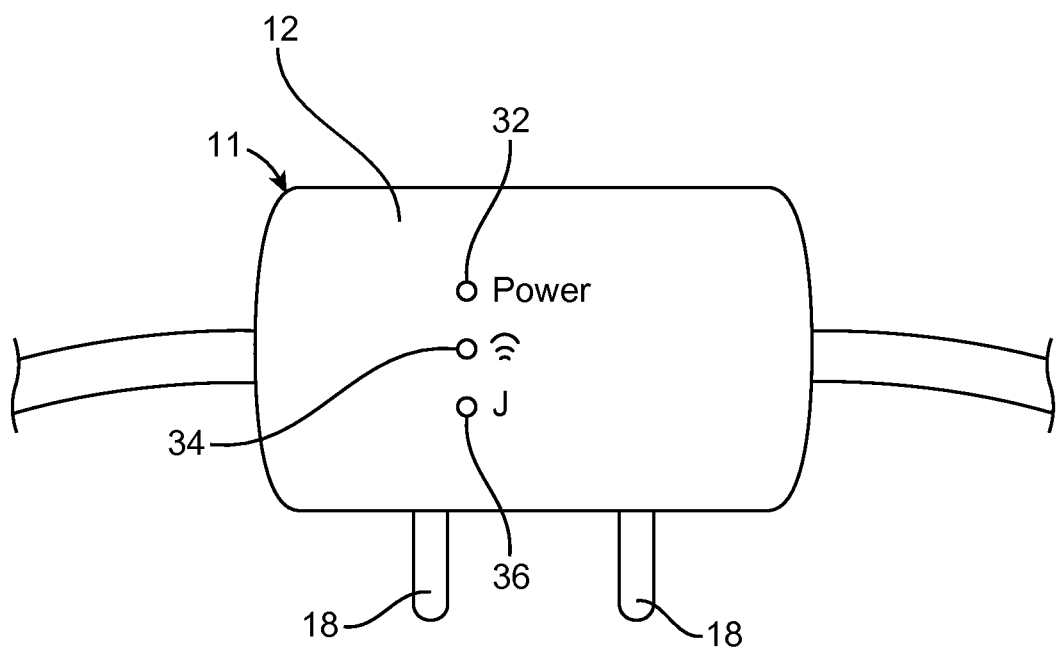
FIG. 5 is an illustration of a top view of the outer housing.

Referring to FIGS. 2 and 3, the third LED indicator 36 can indicate whether the dog's neck is located in a first distance state or a second distance state. In the first distance state, the delivery unit 11 can be configured to deliver the electric signal via the pair of electrodes when the distance between the dog's neck and the ground, as measured by the position detection system, surpasses the corresponding threshold value. On the other hand, in the second distance state, the delivery unit 11 can be configured to forego delivery of the electric signal via the pair of electrodes irrespective of the current distance between the dog's neck and the ground. As well, the third LED indicator 36 can be configured to indicate whether the dog's neck is in a first angle state or a second angle state. In the first angle state, the delivery unit 11 can be configured to deliver the electric signal via the pair of electrodes when the angle between the dog's neck and the ground, as measured by the position detection system, surpasses the corresponding threshold value. On the other hand, in the second angle state, the delivery unit 11 can be configured to forego delivery of the electric signal via the pair of electrodes irrespective of the angle between the dog's neck and the ground. In one embodiment, as can be appreciated from FIG. 5, the first, second, and third LED indicators are disposed on top of the outer housing 12.

As illustrated in FIG. 2, some embodiments of the delivery unit 11 can include a button 19 configured to control various operations of the delivery unit 11. As such, the button 19 can be configured to activate and deactivate various operations based upon different clicks of the button 19. For example, if a user presses and holds the button 19, this can power down the delivery unit 11. Accordingly, once the delivery unit 11 is in a powered down state, the delivery unit 11 can be powered on by pressing the button 19.

As well, the button 19 can be configured to toggle between other various operations, as indicated by the LED indicators 32, 34, and 36. In some embodiments, a single click of the button 19 can allow the user to move from the second LED indicator 34 to the third LED indicator 36. Double clicking the button 19 can allow the user to select the different states as indicated by each LED indicator. For example, if the user single clicks to the second LED indicator 34, the user can then double click the button 19 to move between the first wireless state and the second wireless state. Accordingly, if the user single clicks the button 19, such that the user is able to control the third LED indicator 36, the user may then double click the button 19 to thereby move between the various states as indicated by the third LED indicator 36. Specifically, the user can double click to select the first distance state, second distance state, first angle state, and/or the second angle state. It should be appreciated that persons of ordinary skill in the art can implement the button 19 according to any other configuration. For example, the button clicks may be reversed, such that double clicks of the button 19 move from the second LED indicator 34 to the third LED indicator 36, while single clicks allow the user to select various states within each of the second and third LED indicators 34 and 36.

Referring to FIG. 4, the delivery unit 11 can further be configured to be in communication with a remote computing device 26 via a dedicated software program (i.e., a computer application) for the remote operation thereof. The remote computing device 26 may comprise a laptop, a tablet PC, or a smartphone. The communication between the remote computing device 26 and the system 10 can be facilitated by a suitable wireless communications network 28 such as, the Internet (WiFi), a Wireless Local Area Network (WLAN), Bluetooth, infrared, etc. More particularly, the delivery unit 11 further comprises a wireless communication module 30 disposed there within wherein, the wireless communication module 30 establishes radio communication between the remote computing device 26 and the delivery unit 11.

The computer application (or software program) can provide access to a settings section that can enable a user to set the threshold values of the distance between the dog's neck and the ground. Furthermore, the application can enable the user to set the threshold values of the angle of the dog's neck with respect to the ground, the type of motion of the dog's neck with respect to the ground. As well, the settings section can also enable the user to determine the duration or intensity of the signal delivered through the pair of electrodes.

Referring to FIGS. 2-6, the computer application can further include first and second toggle icons 38 and 40 that can be functionally identical to the first and the third LED indicators 32 and 36. In this manner, the user can be enabled to access the functions of the delivery unit 11 remotely from the remote computing device 26. The first icon 38 can be deployable between a first power state and a second power state. In the first power state, the delivery unit 11 can be remotely powered on. Accordingly, in the second power state, the delivery unit 11 can be remotely powered off.

Figure 6:
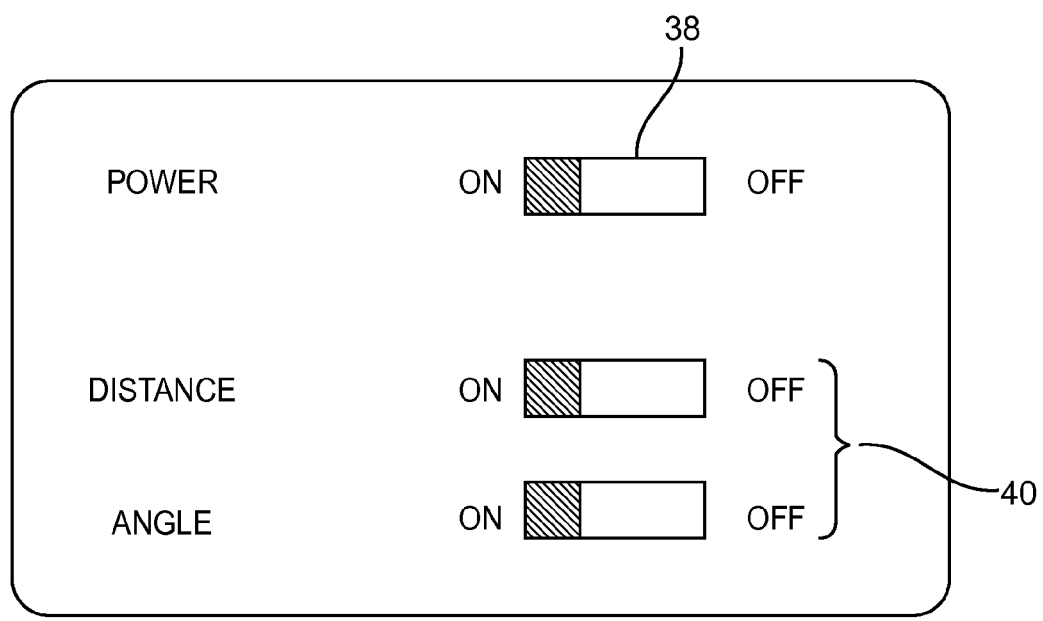
FIG. 6 is a screenshot of the first and second toggle icons.

With reference to FIG. 6, the second icon 40 can be a combination of two toggle sub-icons. The first sub-icon can be deployable between a first distance state and a second distance state. In the first distance state, the delivery unit 11 (i.e., particularly the processor 24) can be remotely ordered to deliver the electric signal via the pair of electrodes 18 when the current distance between the dog's neck and the ground as measured by the position detection system 20 surpasses the corresponding threshold value. For example, if the threshold value is 36 inches, then the delivery unit 11 will deliver the electric signal when the distance between the dog's neck and the ground is any value greater than 36 inches. On the other hand, in the second distance state, the delivery unit 11 can be configured to forego delivery of the electric signal via the pair of electrodes 18 irrespective of the current distance between the dog's neck and the ground. In other words, in the second distance state, the delivery unit 11 can forego delivery of the electric signal when the distance between the dog's neck and the ground is above, below, or equal to the threshold value.

The second sub-icon can be deployable between a first angle state and a second angle state. In the first angle state, the delivery unit 11 can deliver the electric signal via the pair of electrodes 18 when the angle between the dog's neck and the ground, as measured by the position detection system 20, surpasses the corresponding threshold value. For example, if the threshold value is 40-degrees, then the delivery unit 11 will deliver the electric signal when the angle between the dog's neck and the ground is any value greater than 40-degrees. On the other hand, in the second angle state, the delivery unit 11 can be configured to forego delivery of the electric signal via the pair of electrodes 18, irrespective of the angle between the dog's neck and the ground. In other words, in the second angle state, the delivery unit 11 will forego delivery of the electric signal when the angle between the dog's neck and the ground is above, below, or equal to the threshold value.

In some embodiments (not shown), the delivery unit 11 further can further include a camera coupled to the outer housing 12. The system can be configured such that, the images or videos captured by the camera are transmitted to a remote computing device. In some embodiments, the delivery unit 11 can further include a motion detector in operative communication with the camera such that, the camera can be configured to capture an image(s) or a video upon the detection of motion by the motion detector. Accordingly, the captured images or videos can be transmitted to the remote computing device.

This disclosure also includes a method for monitoring and correcting the behavior of a dog. The method can include coupling the outer housing 12 to a neck collar. Accordingly, the method can include attaching the outer housing 12 to a location below the dog's mouth. Specifically referring to FIG. 7, the method can further include listing (step 100) a plurality of predetermined threshold values within a database associated with the delivery unit 11. The plurality of threshold values can include the distance between the dog's neck and the ground, the angle of the dog's neck with respect to the ground, and the motion of the dog's neck with respect to the ground.

Figure 7:
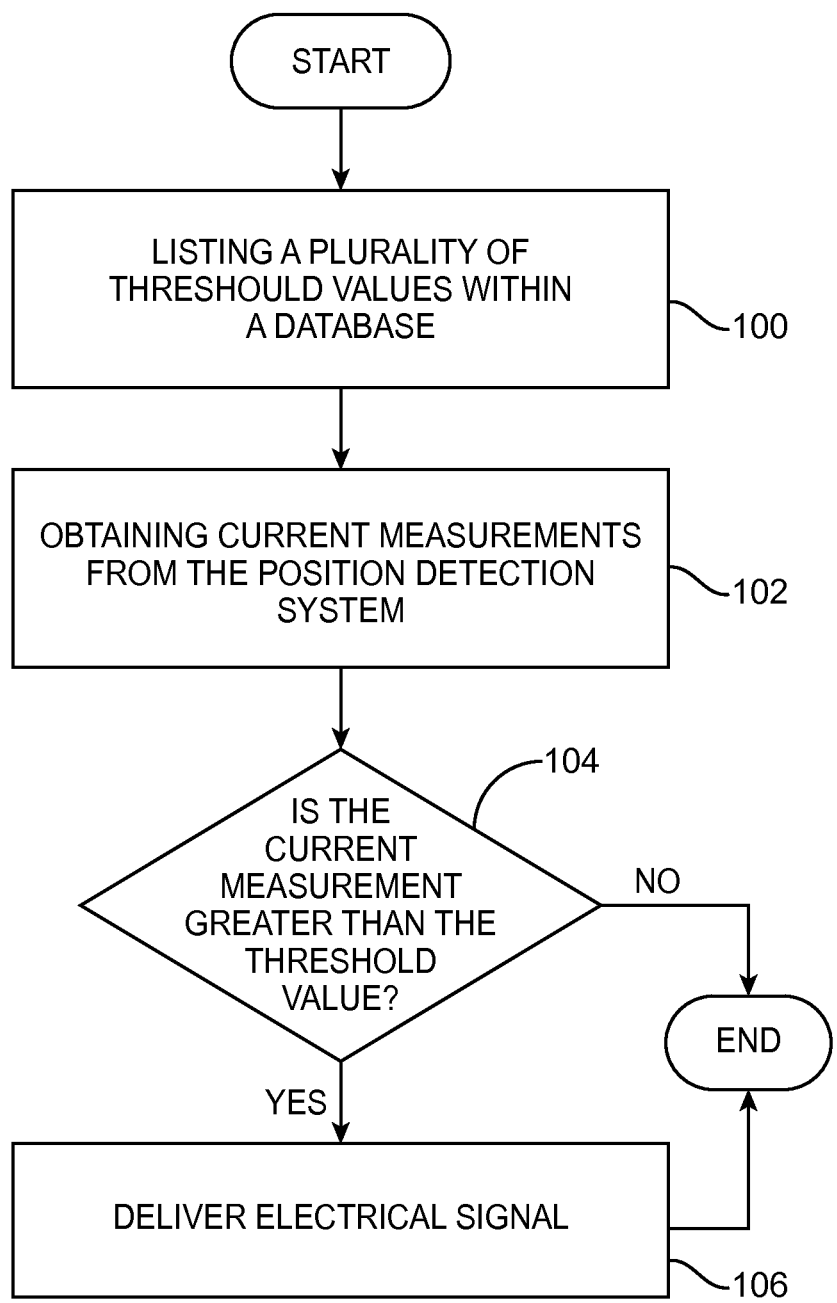
FIG. 7 is a flowchart of the method for monitoring and controlling a dog.

Referring to FIG. 7, the method can further include obtaining (step 102) the current measurements of the distance between the dog's neck and the ground, the angle of the dog's neck with respect to the ground, and the motion of the dog's neck with respect to the ground. More particularly, the current measurements can be obtained by a position detection system, which can be coupled to the outer housing 12. The position detection system, more particularly, can include an accelerometer.

Referring to FIG. 7, the method can further include comparing (step 104) the obtained current measurements against the corresponding threshold values. The method can further include delivering (step 106) an electrical signal through the pair of electrodes 18 to the dog in the event that at least one value is detected to be greater than the threshold value. In doing so, this can provide a self-correctional or preventive behavior in the dog during; thus, deterring the dog from repeating it's activity.

Figure 8:
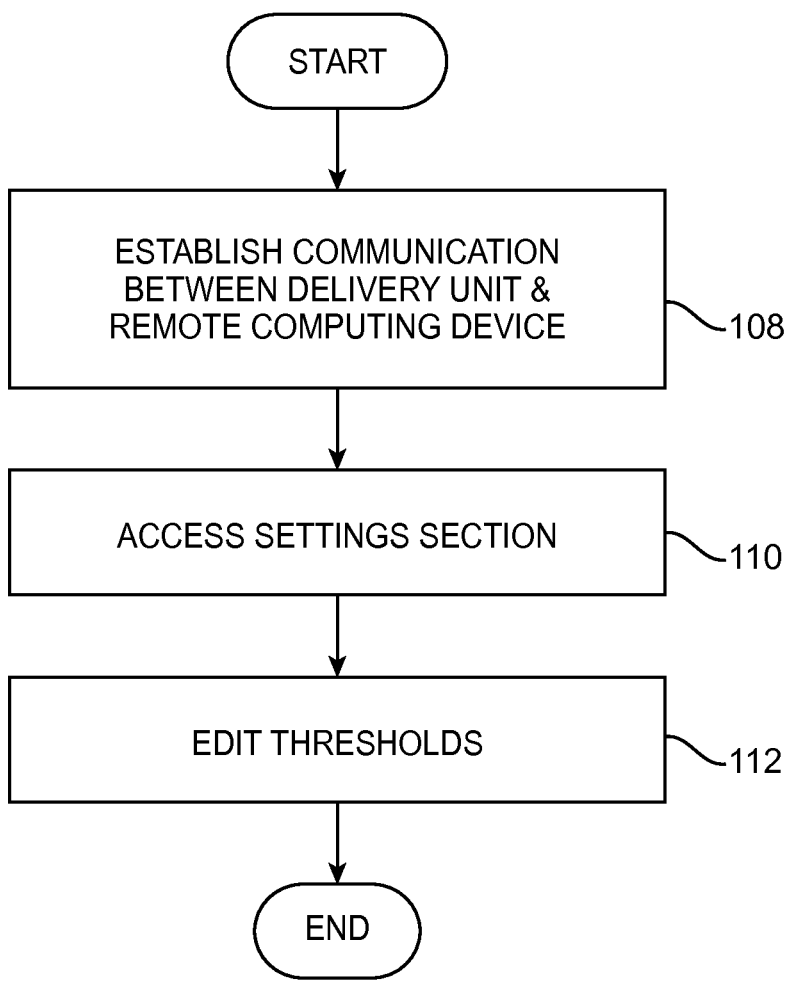
FIG. 8 is a flowchart depicting the method of setting threshold values for the delivery of electrical signals.

Referring to FIG. 8, the method of setting threshold values for the delivery of electrical signals through the pair of electrodes 18 can include providing (step 108) a wireless communication module within the outer housing. The wireless communication module can facilitate remote communication between the delivery unit 11 and a remote computing device via a dedicated computer application (or software program) over a wireless communications network. Furthermore, the remote computing device may comprise a laptop, a tablet PC, or a smartphone. The wireless communications network may comprise any suitable network such as an Internet (WiFi), Wireless Local Area Network (WLAN), infrared, Bluetooth, etc. The method can further include accessing (step 110) a settings section on the computer application and editing (step 112) the threshold values as per the user's discretion.

Figure 9:
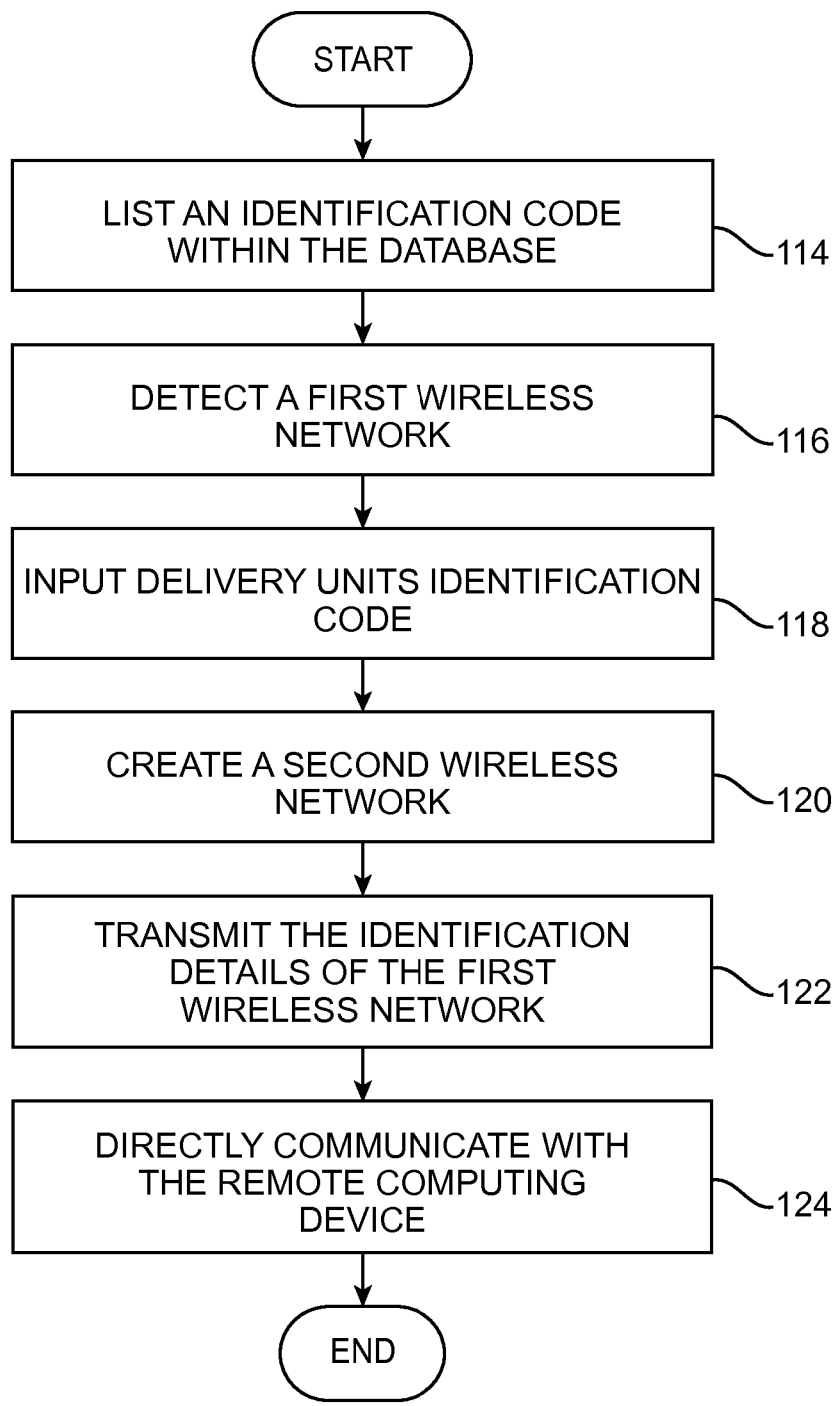
FIG. 9 is a flowchart depicting the method of establishing pairing between a remote computing device and the delivery unit.

Referring to FIG. 9, the method can include pairing a remote computing device and the delivery unit 11. In order to pair the remote computing device with the delivery unit 11 the method include listing (step 114) an identification code within the database. The identification code can pertain to the remote computing device. The method can further include detecting (step 116) a first wireless network having a name and a password and inputting (step 118) the delivery unit's identification code into the appropriate network access fields in the remote computing device so as to verify whether or not the remote computing device is authorized to communicate with the delivery unit 11. The method can further include creating (step 120) a second wireless network by either the delivery unit 11 or the remote computing device or both. The method can further include transmitting (step 122) the name and the password of the first wireless network directly from the remote computing device to the delivery unit 11 via the second wireless network so as to enable the delivery unit 11 to communicate with the remote located computing device via the first wireless network. As well, the method can include directly communicating (step 124) with the remote computing device via the second wireless network prior to the delivery unit 11 indirectly communicating with the remote computing device via the first wireless network.

Figure 10:
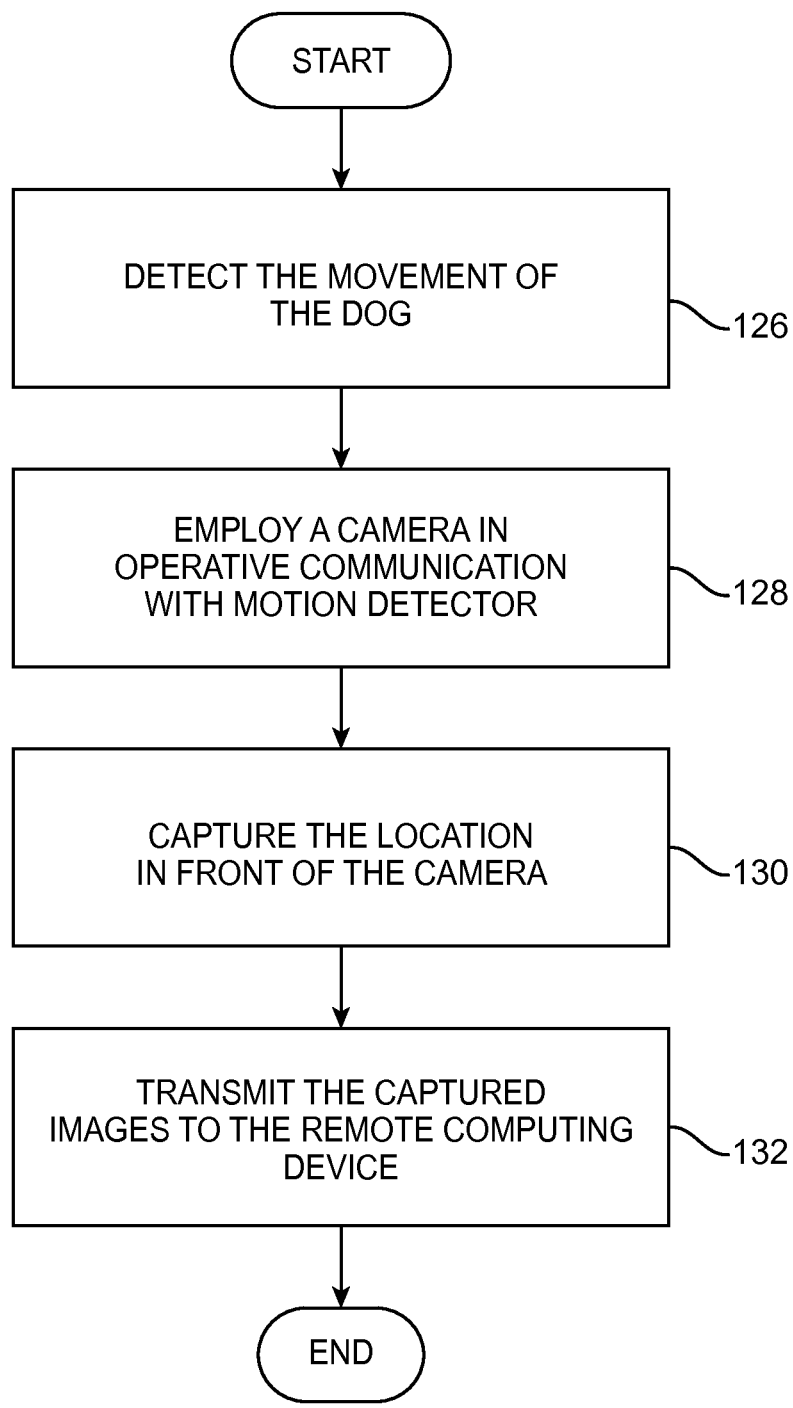
FIG. 10 is a flowchart depicting the method of detecting the location of the dog prior to its movement.

Referring to FIG. 10, the method of detecting the location of the dog, prior to its movement, can include detecting (step 126) movement of the dog by a motion detector within the outer housing 12. As well, the method can include employing (step 128) a camera within the outer housing 12 and disposing the camera in operative communication with the motion detector. Furthermore, in response to the motion detector detecting motion, the method can include capturing (step 130) video and/or images of the location in front of the camera. Moreover, the method can include transmitting (step 132) the captured images and/or video to the remote computing device. Accordingly, the images and/or video can indicate an action as performed by the dog.

The aforementioned embodiments are able to be implemented, for example, using a machine-readable medium or article which is able to store an instruction or a set of instructions that, if executed by a machine, cause the machine to perform a method and/or operations described herein. Such machine is able to include, for example, any suitable processing platform, computing platform, computing device, processing device, electronic device, electronic system, computing system, processing system, computer, processor, or the like, and is able to be implemented using any suitable combination of hardware and/or software. The machine-readable medium or article is able to include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

Furthermore, the instructions are able to include any suitable type of code, for example, source code, compiled code, interpreted code, executable code, static code, dynamic code, or the like, and is able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

Interpretation

While this disclosure primarily discusses the systems and methods in the context of a dog, it should be appreciated that the systems and methods can be implemented for any type of animal, such as, but not limited to a domesticated animal (e.g. a cat).

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A system for monitoring and correcting behavior of a dog, the system comprising:
   an outer housing configured to couple to a dog collar;
   a first electrode protruding from the outer housing, wherein the first electrode is configured to deliver a first signal to a first portion of the dog's skin;
   a second electrode spaced from the first electrode and protruding from the outer housing, wherein the second electrode is configured to deliver a second signal to a second portion of the dog's skin; and
   a position detection system electrically coupled to the first electrode and the second electrode, wherein the position detection system comprises an accelerometer, and wherein the position detection system is configured to detect one of a predetermined distance of the dog's neck with respect to a ground surface, a predetermined motion of the dog's neck with respect to the ground surface, and a predetermined angle of the dog's neck with respect to a level surface; and
   a remote computing device communicatively coupled to the position detection system, wherein the remote computing device is configured to control at least one of threshold and duration of intensity of the first signal and the second signal, wherein the remote computing device is configured to select the predetermined distance of the dog's neck with respect to the ground surface and select the predetermined angle of the dog's neck with respect to the level surface, and wherein in response to the position detection system detecting that at least one of the dog's neck is located greater than or equal to the predetermined distance from the ground surface, and the dog's neck is located greater than at least the predetermined angle from the level surface, the system is configured to deliver the first signal and the second signal to the dog's skin via the first electrode and the second electrode.

2. The system of claim 1, further comprising a power source electrically coupled to the position detection system, the first electrode, and the second electrode.

3. The system of claim 2, further comprising a wireless communication module coupled to the outer housing and coupled to the position detection system, wherein the wireless communication module comprises at least one of Bluetooth, wireless local area network (WiFi), infrared, and radio frequency.

4. The system of claim 1, wherein the outer housing comprises a back surface and a front surface facing opposite the back surface, the system further comprising a button coupled to the front surface of the outer housing, wherein the button is configured to select at least one of:
   a first power state whereby the system is powered on,
   a second power state whereby the system is powered off,
   a first wireless state whereby the wireless communications module is able to wirelessly communicate with the remote computing device,
   a second wireless state whereby the wireless communications module is disabled from wirelessly communicating with the remote computing device,
   a first distance state whereby the system delivers the signal to the dog's neck upon in response to detecting the dog's neck is located at least the predetermined distance from the ground surface,
   a second distance state whereby the system does not deliver the signal to the dog's neck upon in response to detecting the dog's neck is located at least the predetermined distance from the ground surface,
   a first angle state whereby the system delivers the signal to the dog's neck in response to detecting the dog's neck is located at least the predetermined angle from the level surface, and
   a second angle state whereby the system does not deliver the signal to the dog's neck in response to detecting the dog's neck is located at least the predetermined angle from the level surface.

5. The system of claim 1, wherein the system comprises a camera coupled to the outer housing, wherein the camera is configured to record an image, and wherein the system is configured to transmit the image to the remote computing device.

6. The system of claim 5, wherein the system comprises a motion detector configured to detect a movement of the dog, and wherein the camera is configured to record the image based upon the motion detector detecting the movement.

7. A method of monitoring and correcting behavior of a dog using a behavior monitoring system having an outer housing configured to couple to a dog collar, a first electrode and a second electrode each protruding from the outer housing, and a position detection system electrically coupled to the first electrode and the second electrode, wherein the position detection system comprises an accelerometer, the method comprising:
   coupling the first electrode to a first portion of a dog's skin such that the first electrode is configured to deliver a first signal to the first portion of the dog's skin;
   coupling the second electrode to a second portion of the dog's skin such that the second electrode is configured to deliver a second signal to the second portion of the dog's skin; and
   configuring the position detection system to detect one of a predetermined distance of the delivery unit with respect to a ground surface, a predetermined motion of the delivery unit with respect to the ground surface, and a predetermined angle of the delivery unit with respect to a level surface; and in response to the position detection system detecting at least one of the delivery unit is positioned greater than or equal to the predetermined distance from the ground surface and the delivery unit is positioned greater than or equal to the predetermined angle from the level surface, delivering the first signal, via the first electrode, to the first portion of the dog's skin and delivering the second signal, via the second electrode, to the second portion of the dog's skin.

8. The method of claim 7, wherein the system further comprises a wireless communication module and a remote computing device communicatively coupled to the wireless communication module, wherein the wireless communication module comprises at least one of Bluetooth, wireless local area network (WiFi), infrared, and radio frequency.

9. The method of claim 8, further comprising using the remote computing device to test whether one of the first electrode is coupled to the first portion of the dog's skin and the second electrode is coupled to the second portion of the dog's skin.

10. The method of claim 9, further comprising delivering one of the first signal, via the first electrode, to the first portion of the dog's skin and the second signal, via the second electrode, to the second portion of the dog's skin.

11. The method of claim 8, further comprising:
using the remote computing device to select an intensity level of the first and second signals; and
using the remote computing device to select a threshold level of the first and second signals.

12. The method of claim 11, wherein the first signal substantially equals the second signal.

13. The method of claim 8, wherein the system includes a system identification code that is associated with the system, the method further comprising:
detecting a first wireless network having a name and a password;
inputting the system identification code into the remote computing device to verify whether the remote computing device is authorized to communicate with the system;
creating a second wireless network by at least one of the system and the remote computing device;
transmitting the name and the password of the first wireless network directly from the remote computing device to the system via the second wireless network to enable the system to communicate with the remote located computing device via the first wireless network; and
directly communicating with the remote computing device via the second wireless network prior to the system indirectly communicating with the remote computing device via the first wireless network.

14. The method of claim 8, wherein the system comprises a motion detector configured to detect a movement of the dog, wherein the system comprises a camera coupled to the outer housing, wherein the camera is configured to record an image, the method further comprising:
detecting the movement of the dog;
in response to detecting the movement of the dog, using the camera to record the image; and
in response to using the camera to record the image, transmitting the image to the remote computing device.

* * * * *